(12) United States Patent
Johansson et al.

(10) Patent No.: US 8,578,153 B2
(45) Date of Patent: Nov. 5, 2013

(54) METHOD AND ARRANGEMENT FOR PROVISIONING AND MANAGING A DEVICE

(75) Inventors: Mattias Johansson, Spånga (SE); Hakan Englund, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 946 days.

(21) Appl. No.: 12/606,490

(22) Filed: Oct. 27, 2009

(65) Prior Publication Data

US 2010/0106967 A1    Apr. 29, 2010

Related U.S. Application Data

(60) Provisional application No. 61/108,994, filed on Oct. 28, 2008.

(51) Int. Cl.
*H04L 29/06* (2006.01)

(52) U.S. Cl.
USPC .............................................. 713/158; 726/6

(58) Field of Classification Search
USPC .............................................. 713/158; 726/6
See application file for complete search history.

(56) References Cited

U.S. PATENT DOCUMENTS

| | | | |
|---|---|---|---|
| 2003/0149666 A1* | 8/2003 | Davies ............................. | 705/50 |
| 2005/0155036 A1* | 7/2005 | Tiainen et al. ................. | 719/310 |
| 2007/0003062 A1* | 1/2007 | Mizikovsky et al. .......... | 380/270 |
| 2007/0250617 A1 | 10/2007 | Kim et al. | |
| 2008/0282090 A1* | 11/2008 | Leybovich ..................... | 713/182 |
| 2008/0301463 A1* | 12/2008 | Michelsen ..................... | 713/185 |
| 2009/0217348 A1* | 8/2009 | Salmela et al. .................. | 726/2 |

FOREIGN PATENT DOCUMENTS

WO    WO 2006/092642 A1    9/2006

OTHER PUBLICATIONS

Tuladhar, Summit. "Inter-Domain Authentication for Seamless Roaming in Heterogeneous Wireless Network" Pub. Date. 2007. pp. 1-50.*
Open Mobile Alliance, "Device Management Requirements". Approved Version 1.2. Feb. 9, 2007.

* cited by examiner

*Primary Examiner* — Krista Zele
*Assistant Examiner* — James Forman

(57) ABSTRACT

A system, method, and owner node for securely changing a mobile device from an old owner to a new owner, or from an old operator network to a new operator network. The old owner initiates the change of owner or operator. The old owner or operator then commands the mobile device to change a currently active first key to a second key. The second key is then transferred to the new owner or operator. The new owner or operator then commands the mobile device to change the second key to a third key for use between the mobile device and the new owner or operator. Upon completion of the change, the new owner or operator does not know the first key in use before the change, and the old owner does not know the third key in use after the change.

11 Claims, 9 Drawing Sheets

Enterprise case:

Consumer case:

METHOD AND ARRANGEMENT FOR PROVISIONING AND MANAGING A DEVICE

CROSS-REFERENCE TO RELATED APPLICATIONS

This application claims the benefit of U.S. Provisional Application No. 61/108,994 filed Oct. 28, 2008, the contents of which are incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to radio telecommunication systems. More particularly, and not by way of limitation, the present invention is directed to an apparatus and method for remote initial provisioning of Universal Subscriber Identity Modules (USIMs) and subsequent changing of an operator.

There is currently an ongoing study item in 3GPP targeting to create an architecture and solution for remote initial provisioning of USIMs and subsequent changing of an operator. The study is reported in the technical report, 3GPP TR 33.812, version 1.3.0. Remotely manageable USIMs are considered for Machine-to-machine (M2M) communication, i.e., communication between devices without user interaction.

A typical use case for an M2M device is electric metering. In this case, an electric supplier company installs automatic metering devices that report the amount of consumed electricity back to the billing department via a 3GPP network. Since millions of such devices may be installed, remote management of subscriptions would greatly reduce costs, for example, in the case of a change of subscription. In this use case, the end user and the owner of the devices is an enterprise with a large number of devices in the field. Thus, it is likely that the owner will have its own servers that can manage the devices.

Another use case is for built-in terminals in cars. In this case it is a single owner of the car that would like to control which telecommunication operator the car is using, and also the services to which the car is attached such as insurance service, maintenance services, and road toll services. In this use case, it is envisioned that a car owner's mobile terminal could function as the enterprise server above, containing all the necessary intelligence to manage the car.

The existing 3GPP architecture and remotely managed procedure for provisioning an M2M device is complex and still leaves security gaps.

There is no solution for how to simplify the process of changing the operator, and how to couple that process to secure service set-up. Under existing procedures, at manufacture time, a Platform Validation Authority (PVA) certificate is installed as a trusted certificate in a M2ME device. However, all operators with a certificate signed by the PVA are able to perform a valid provisioning of the M2M device. This creates the problem commonly referred to as slamming, i.e., illegal changing of subscribers telephone service without their consent.

From an operator's perspective it is also important that the discovery function through which the device discovers its new Selected Home Operator (SHO) is authenticated by the device. An unauthenticated rouge discovery function could divert a large number of M2M devices to connect to some operator's network, causing a denial-of-service attack on the network.

Current devices use a SIM/USIM card to provide the TRE, and one method of changing the operator is to physically replace the SIM/USIM card. However, some devices are unattended, so physically changing the SIM/USIM card is difficult. Also, just because a person has physical access to the device does not mean that person has the right to change the operator.

There is currently no flexible authentication mechanism to prevent these types of attacks and drawbacks associated with the prior art.

SUMMARY

An embodiment of the present invention provides the device with the ability to authenticate that a provisioning of the device is actually initiated by the owner of the device. The invention also provides the device with the ability to authenticate the Discovery and Registration Function (DRF) involved in a change of operator.

There is need for multiple keys in the process of provisioning Downloadable USIMs (DLUSIMs) and the subsequent change of operator. In the provisioning phase a symmetric key $K_{PIMSI}$ is first used to give initial air time, and following this, an asymmetric (or in some cases, symmetric) key $K_{Provision}$ is used to download the DLUSIM. When the operator is changed, a new $K_{PIMSI}$ may be needed, and the invention provides the ability to send a command to the remote device to authorize the change of operator. Also, throughout the life-cycle of the device, different end-user services may request to set up secure end-to-end connections. This can be done by allowing the end-user services to download their specific clients onto the device. If this is done, it should be done only with the authorization from the device owner. According to the invention the key hierarchy can be used to achieve easier operator change and also to facilitate secure end-to-end service set-up.

According to embodiments of the invention, a device is configured with a device key $K_{Device}$ and a plurality of one-way functions enabling derivation of a key hierarchy. By introducing a $K_{Device}$ (and making some keys derivable from this) the management activities are simplified. The present invention derives all other keys from this single $K_{Device}$ with one-way functions known to the device and device owner, denoted by $h_i(\ )$, $0 \leq i \leq 6$. By introducing one device key, the invention also simplifies the device-manufacturing process and the usability for the end-user, independent of whether the end-user is an enterprise or a consumer. It is also much easier to let the device change its purpose over time.

To enable this key management scheme, where a manager of the device (most commonly the owner of the device, but this may in different scenarios be also outsourced to another entity or be taken up by a user trusted by the owner) has the final control of the device, the invention provides a method for updating the device key and for changing a subscriber key.

Further, the invention provides a modified M2M device and owner node. According to exemplary embodiments, the owner node is implemented as an enterprise server or as a mobile entity (ME).

Characteristic features of the invention relate to a key-hierarchy extending the DLUSIM framework to also cover general M2M applications and incorporating it into the general Open Mobile Alliance Device Management (OMA DM) framework. A further extension relates to how to change $K_{Device}$, and how to change the subscription key without sending it over the cellular channel.

Thus, in one embodiment, the present invention is directed to a method of securely changing control of a device from an old manager to a new manager, wherein the device obeys commands from a manager only if the commands include a device key known to the device. The method includes the steps of initiating the change of control by the old manager, the initiating step including changing a first device key in use between the old manager and the device to a second device key, and sending the second device key from the old manager to the new manager, preferably over a secure connection. The method also includes completing the change of control by the new manager, the completing step including changing the second device key in use between the new manager and the device to a third device key. Upon completion of the change of control, the new manager does not know the first device key and the old manager does not know the third device key.

In another embodiment, the present invention is directed to a method of securely changing a communication device from an old operator to a new operator, wherein the communication device has a subscription key and obeys commands from an operator only if the commands include an authentication key known to the communication device. The method includes the steps of initiating the change of operator by a manager of the communication device; in response to the initiating step, changing a first subscription key in use between the old operator and the communication device to a second subscription key; sending the second subscription key from the old operator to the new operator; and completing the change of operator by the new operator. The completing step includes changing the second subscription key in use between the new operator and the communication device to a third subscription key. Upon completion of the change of operator, the new operator does not know the first subscription key and the old operator does not know the third subscription key.

In another embodiment, the present invention is directed to a first owner node in a telecommunication network for securely changing ownership of a communication device from the first owner node to a second owner node, wherein the communication device obeys commands from owner nodes only if the commands include a device key known to the communication device. The first owner node includes communication means for sending a command to the communication device to change a currently active device key to a new device key, the command including the currently active device key and a secret parameter known by the first owner node; means for calculating the new device key utilizing the currently active device key and the secret parameter; and communication means for sending the new device key to the second owner node.

In another embodiment, the present invention is directed to a second owner node in a telecommunication network for securely obtaining ownership of a communication device from a first owner node, wherein the communication device obeys commands from owner nodes only if the commands include a device key known to the communication device. The second owner node includes communication means for receiving from the first owner node, a currently active device key for the communication device; communication means for sending a command to the communication device to change the currently active device key to a new device key, the command including the currently active device key and a secret parameter known by the second owner node; and means for calculating the new device key utilizing the currently active device key and the secret parameter.

In another embodiment, the present invention is directed to a system for securely changing a communication device from an old operator network to a new operator network, wherein the communication device has a subscription key and obeys commands from an operator network only if the commands include an authentication key known to the communication device. The system includes an owner node of the communication device for initiating the change of operator network by sending a subscription registration message to the new operator network, the subscription registration message including first and second authentication keys and an identifier of the communication device; communication means within the new operator network for sending a notification to the old operator network indicating that the new operator network has a new subscription with the communication device; and communication means within the old operator network for sending a command to the communication device to change a currently active first subscription key to a second subscription key, the command including a currently active authentication key and a secret parameter known by the old operator network. The system also includes means within the communication device for calculating the second subscription key utilizing the first subscription key and the secret parameter received from the old operator network; means within the old operator network for calculating the second subscription key; and communication means within the old operator network for sending the second subscription key to the new operator network. The system also includes communication means within the new operator network for sending a command to the communication device to change the second subscription key to a third subscription key, the command including the first authentication key received from the owner node and a secret parameter known by the new operator network; means within the communication device for calculating the third subscription key utilizing the second subscription key and the secret parameter received from the new operator network; and means within the new operator network for calculating the third subscription key.

In another embodiment, the present invention is directed to a method of downloading a new Downloadable Universal Subscriber Identity Module (DLUSIM) to a communication device while changing the communication device from a first operator network to a second operator network. The method begins by a manager of the communication device registering with the second operator network, wherein the registering step includes transferring $K_{Auth}$ to the second operator network. The communication device then receives a bootstrapping message instructing the device to connect to a provisioning service of the new operator network, wherein the bootstrapping message includes an address of the provisioning service of the new operator network and an authentication nonce. The new operator network then validates the communication device when the communication device attempts to connect to the provisioning service. This is followed by the second operator network generating a new DLUSIM and encrypting the DLUSIM with $K_{Provision}$; and downloading the DLUSIM as an encrypted blob to the communication device from an Open Mobile Alliance Device Management (OMA DM) provisioning server in the second operator network. The communication device then attaches to the second operator network utilizing the new DLUSIM.

BRIEF DESCRIPTION OF THE DRAWINGS

In the following section, the invention will be described with reference to exemplary embodiments illustrated in the figures, in which.

DETAILED DESCRIPTION

Figure 1:
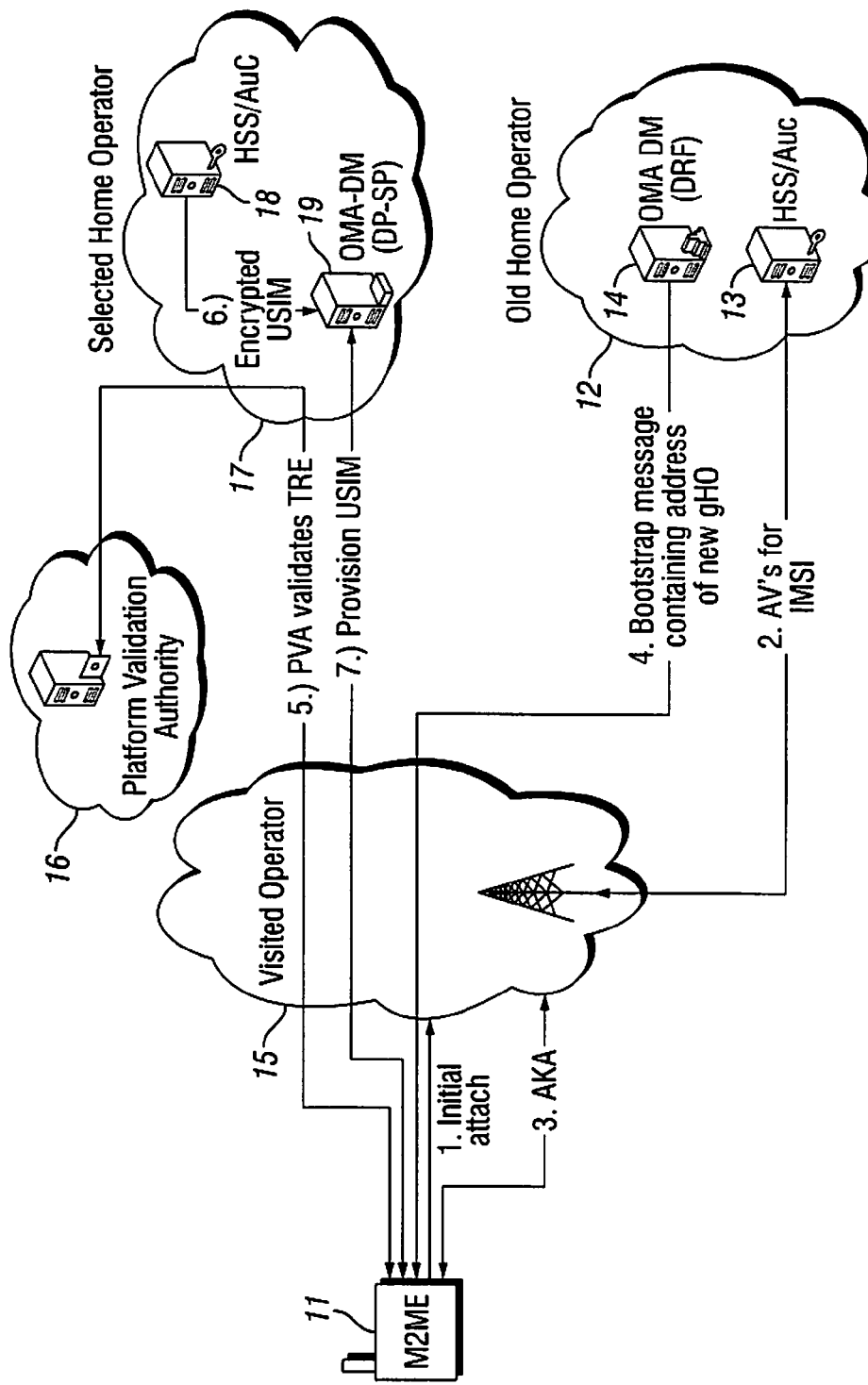
FIG. 1 is a high level message flow diagram illustrating an existing architecture and remotely managed procedure for changing an operator for an M2M device.

FIG. 1 is a high level message flow diagram illustrating an existing architecture and remotely managed procedure for changing an operator for an M2M device 11. An Old Home Operator (OHO) 12, which includes a Home Subscriber Server/Authentication Center (HSS/AuC) 13 and a Discovery and Registration Function (DRF) 14, provides the M2M device with initial network IP connectivity, possibly via a roaming partner called the Visited Operator (VO) 15. Thus, the VO provides the air interface to the M2M device in this scenario. Additionally there is assumed to be a trusted third party called the Platform Validation Authority (PVA) 16. The PVA issues certificates for all entities in the structure and can validate the Trusted Execution Environment (TRE) of the M2M device. Also illustrated is a Selected Home Operator (SHO) 17, which includes an HSS/AuC 18 and a provisioning server (DP-SP) 19.

The M2M device 11 uses the standard GSM/UMTS procedures (GPRS/PS) to decode network information, and attaches to the network of any mobile network operator. In the attach message, the M2M device sends its International Mobile Station Identity (IMSI) to the chosen operator, referred to as the Visited Operator (VO) 15. The VO contacts the OHO 12 and asks for authentication vectors (AVs). The HSS/AuC 13 returns the AVs, and the VO uses the received AVs to authenticate the M2M device.

If authentication of the M2M device by the VO is successful, the VO provides IP connectivity for the M2M device to be able to reach the DRF 14. The DRF aids the M2M device to find its new SHO 17. This may be done by sending an OMA DM bootstrapping message 20 to the M2M device. This message also sets the device in a state that enables it to receive a new USIM. The M2M device 11 then connects to the SHO 17, which requests TRE validation credentials from the M2M device. These credentials are forwarded to the trusted third party PVA 16. The PVA validates the authenticity and integrity of the M2M device, and returns the status to the SHO. Upon receiving a positive validation, the SHO prepares a new DLUSIM, encrypts it, and transfers it to the DP-SP 19. The DP-SP provisions a DLUSIM object to the M2M device, possibly by using the OMA DM protocol. The M2M device provisions the downloaded DLUSIM into the TRE and reports the success/failure status of the provisioning to the DP-SP.

As noted above, this existing remotely managed procedure for provisioning an M2M device is complex and still leaves security gaps. An embodiment of the present invention provides the device with the ability to authenticate that a provisioning of the device is actually initiated by the owner of the device. The invention also provides the device with the ability to authenticate the Discovery and Registration Function (DRF) involved in a change of operator.

According to embodiments of the invention, a device is configured with a device key $K_{Device}$ and a plurality of one-way functions enabling derivation of a key hierarchy. There is a need for multiple keys in the process of provisioning DLUSIMs and the subsequent change of operator. In the provisioning phase a symmetric key $K_{PIMSI}$ is first used to give initial air time, and following this, an asymmetric (or in some cases symmetric, although most of this text will assume an asymmetric key) $K_{Provision}$ is used to download the DLUSIM. When the operator is changed, a new $K_{PIMSI}$ is needed, and the invention provides the ability to send a command to the remote device to authorize the change of operator.

Also, throughout the life-cycle of the device, different end-user services may request to set up secure end-to-end connections. This can be done by allowing the end-user services to download their specific clients onto the device. If this is done, it should be done only with the authorization from the device owner. According to the invention the key hierarchy can be used to achieve easier operator change and also to facilitate secure end-to-end service set-up.

By introducing a $K_{Device}$, and deriving other keys from this, the management activities are simplified. In the present invention, all keys are derived from this single key with known one-way functions, denoted by $h_i(\ )$, $0 \leq i \leq 6$.

In an exemplary embodiment, the following relationships are established:

Update of the device key:

$$K_{Device}^{i+1} = h_0(K_{Device}^i, \text{params})$$

Calculate a subscriber key (both KPIMSI and key used by USIM):

$$K_S = h_1(K_{Device}, \text{params})$$

Calculate Trusted Environment management key (to update functions used by the TRE, also DLUSIM mgmt app):

$$K_{TRE\ management} = h_2(K_{Device}, \text{params})$$

Calculate operator change authentication key (to authenticate change of subscriber key):

$$K_{Auth} = h_3(K_{Device}, \text{params})$$

Calculate end-user-service key (to authenticate an end-user application to the M2M device similar to GBA, can also be used as the application provisioning key):

$$K_{End\text{-}user\ service} = h_4(K_{Device}, \text{params})$$

Calculate application provisioning key (to manage applications outside of the TRE, may be derived in the same way as the end-user-service key):

$$K_{Application\ provisioning} = h_5(K_{Device}, params)$$

Additionally, the following one-way function may be used to update the subscriber key in a USIM:

$$K_S^{i+1} = h_6(K_S^i, params)$$

The parameters are different from key to key, but may include a sequence number, operator identifiers, or other additional data used to bind the key to a specific situation, session, or purpose. In some cases it may be beneficial to use the same one-way function for all derivations, i.e., $h_i(x) = h(x)$, $0 \leq i \leq 6$. In such a scenario the parameters taken as input must be arranged such that collisions of inputs are avoided.

There are different scenarios during which the device being remotely managed for DLUSIM can be deployed. Two exemplary scenarios are when the device owner is an enterprise and when the device owner is a consumer. An exemplary enterprise scenario is when the M2M device is contained in an Automatic Meter Reader. An exemplary consumer scenario is when the M2M device is contained in a car.

Figure 2A:
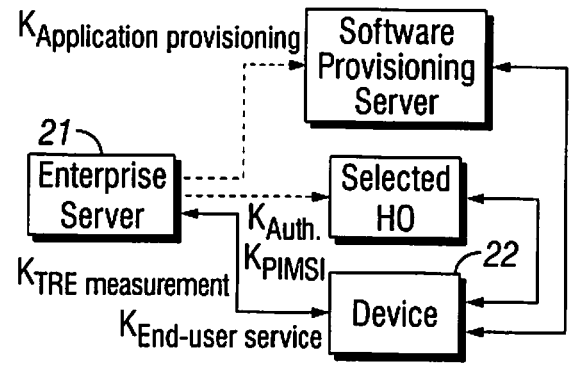
FIGS. 2A-2B are simplified block diagrams illustrating two deployment scenarios according to the teachings of the present invention.
Figure 2B:
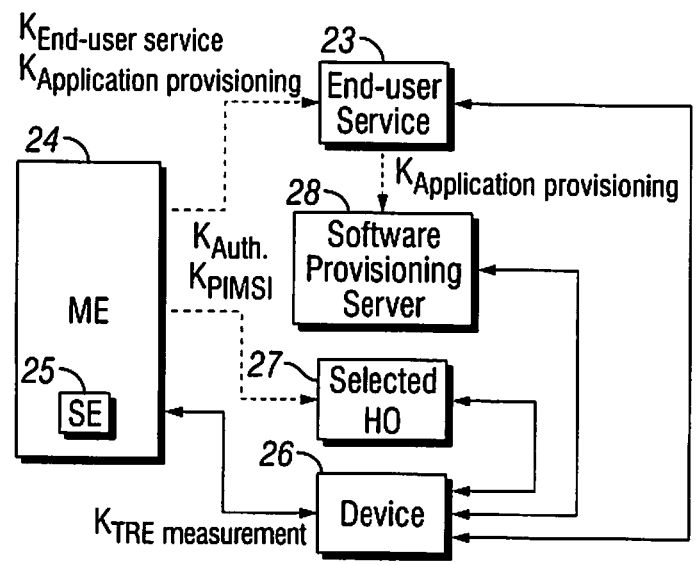

FIGS. 2A-2B are simplified block diagrams illustrating at a high level, an enterprise deployment scenario and a consumer deployment scenario, respectively, according to the teachings of the present invention. The dotted arrows indicate a secure transferal of keys, and the full lines indicate a usage of keys. Note that there are no transferals of keys to the device (and hence not over the cellular interface). These two cases differ in the amount of resources that are assumed on the owner side.

Referring to FIG. 2A, in the enterprise deployment case, the device owner may be an enterprise such as a utility company. In such an example, the enterprise server 21 may be a server at the utility company, which remotely reads individual electric meter devices 22. Each electric meter device includes an M2M device 31 (see FIG. 3) as a subset. In the enterprise case, it can be assumed that the enterprise owns its own server 21, and the end-user service actually ends there.

Referring to FIG. 2B, in the consumer case, the device owner may be an individual consumer. In the case with a consumer as an end-user, it cannot be assumed that the consumer owns the server. Thus, the end-user service 23 is shown separately. Preferably, all key-management is handled in an invisible manner for the consumer. It can be assumed, however, that the consumer has a Mobile Equipment (ME) 24 with a Secure Element (SE) 25 at his disposal. An SE is characterized in that internal data processing and data storage is not available to a user external to the SE. A user external to the SE can only access or provide data over an interface to the SE. The ME may be the consumer's mobile phone, which controls a car sensor device 26 in the consumer's car. The car sensor device also includes an M2M device 31 as a subset.

With a standardized method of deriving keys, each manager of the device (SHO 27, End-user service 23, and Software Provisioning Server 28) can receive the keys that allow the manager to perform its duties, and keys can be handled without any resemblance with each other. Yet the impact on the manufacturing process can be kept at a minimum with storage of only one key. The key-deriving methods on the owner side can also be cost-effectively implemented.

Figure 3:
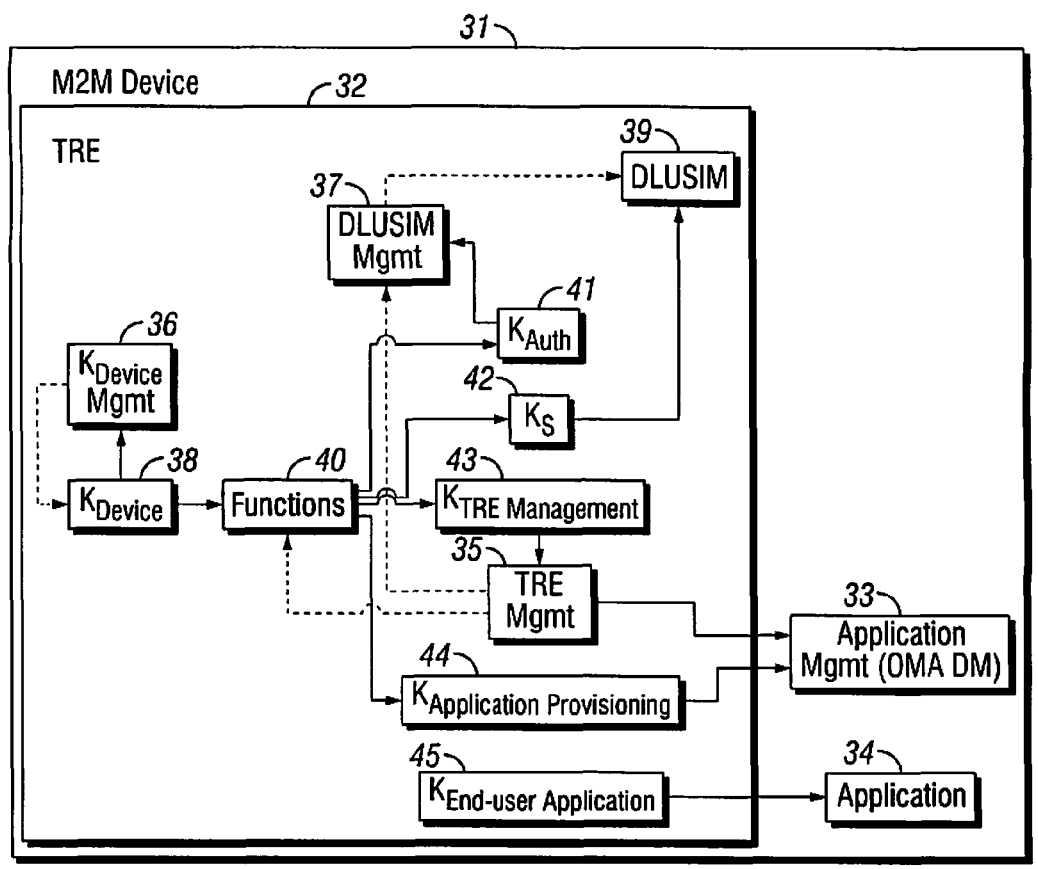
FIG. 3 is a simplified block diagram of an M2M device in an exemplary embodiment of the present invention.

FIG. 3 is a simplified block diagram of an M2M device 31 in an exemplary embodiment of the present invention. When the device owner is an enterprise, device keys can be deployed into a database, for example, by reading a CD or other medium. The source of these device keys is the manufacturer. Using pre-installed software, the enterprise can derive the keys required for different purposes.

On the M2M device 31, there must be support for the required one-way functions and access to the device key. There may also be functionality for updating the device with new key-deriving functions (or new set of parameters) to enable new usages throughout the lifetime of the device. Additionally, functionality for changing the device key (for example in the case of owner change) may also be implemented.

The original device key may be provided as a software key on a storage medium whereby a new key derived from the original key may overwrite the original key or be stored on a separate storage medium. The original device key may also be provided as a hard-coded key, and an actual device key may be derived from the original hard coded key and stored on a storage medium.

The M2M device 31 includes a Trusted Environment (TRE) 32, a unit for application management (OMA DM) 33, and an end-user application 34. Various management units within the TRE such as a TRE Management Unit 35, a $K_{Device}$ Management Unit 36, and a Downloadable USIM (DLUSIM) Management Unit 37 control the updating of the $K_{Device}$ 38 and generating of a DLUSIM 39. Dotted lines represent outputs from the management units.

The $K_{Device}$ Management Unit 36 utilizes the existing $K_{Device}$ 38 and inputs, for example from an owner node, to update $K_{Device}$ utilizing: $K_{Device}^{i+1} = h_0(K_{Device}^i, params)$.

A Functions Unit 40 controls a set of functions for deriving other keys based on the $K_{Device}$ 38 and inputs from the TRE Management Unit 35. These functions include:

- A $K_{Auth}$ Unit 41 for calculating an operator change authentication key to authenticate a change of subscriber key utilizing: $K_{Auth} = h_3(K_{Device}, params)$.
- A $K_S$ Unit 42 for calculating a subscriber key (both KPIMSI and the key used by the USIM) utilizing: $K_S = h_1(K_{Device}, params)$.
- A $K_{TRE\ management}$ Unit 43 for calculating a Trusted Environment management key to update functions used by the TRE and the DLUSIM Management Unit utilizing: $K_{TRE\ management} = h_2(K_{Device}, params)$.
- A $K_{Application\ provisioning}$ Unit 44 for calculating an application provisioning key to manage applications 33 outside of the TRE. The application provisioning key may be derived in the same way as the end-user-service key utilizing: $K_{Application\ provisioning} = h_5(K_{Device}, params)$.
- A $K_{End-user\ Application}$ Unit 45 for calculating an end-user-service key to authenticate an end-user application to the M2M device similar to the Generic Bootstrapping Architecture (GBA) utilizing $K_{End-user\ service} = h_4(K_{Device}, params)$. The end-user service key can also be used as the application provisioning key.
- A one-way function for updating the subscriber key in a USIM utilizing: $K_S^{i+1} = h_6(K_S^i, params)$.

It is assumed that a trusted third party has issued an asymmetric key $K_{Provision}$ $\{K_{PubM2ME}, K_{PrivM2ME}\}$ for an M2M device. The private key is installed in a TRE in the device. The public key is distributed by some method to the owner. An encryption of a message m, using the public key $K_{pub}$, is denoted as $c = E_{KPub}(m)$; similarly decryption using the private key, $K_{Priv}$, is denoted by $m = D_{KPriv}(c)$. $K_{Device}$ is used as an authenticator. This enables the M2M device to authenticate that the issuer of the command is in possession of the valid device key.

Figure 4:
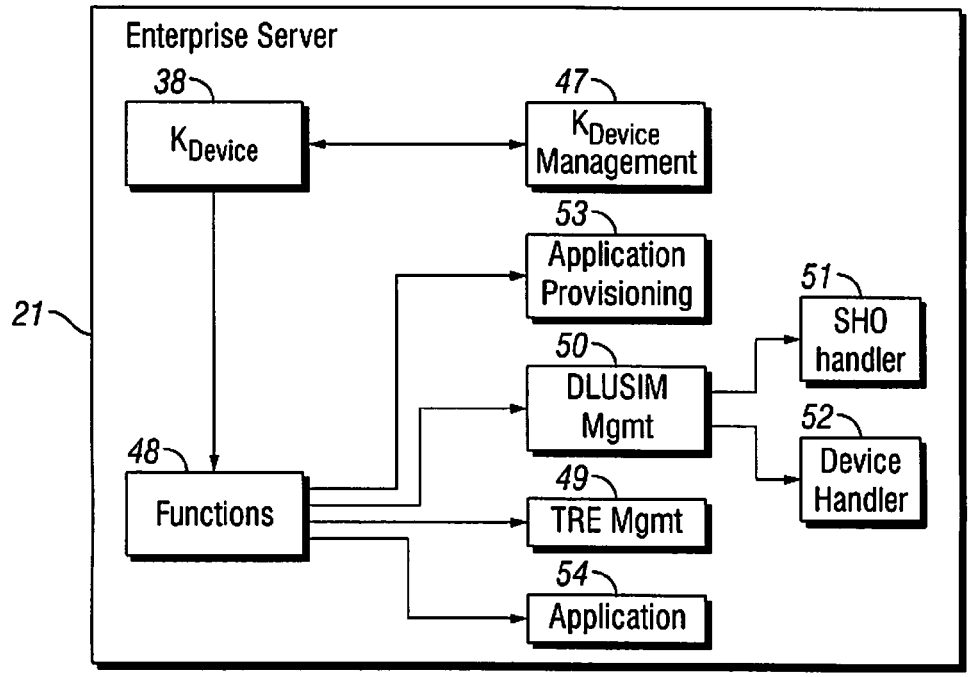
FIG. 4 is a simplified block diagram of an enterprise server in an exemplary embodiment of the present invention.

FIG. 4 is a simplified block diagram of an enterprise server 21 in an exemplary embodiment of the present invention. Referring back to FIG. 2A, the enterprise server is shown at a high level interacting with a software provisioning server, a SHO, and the electric meter device 22. FIG. 4 shows that the enterprise server includes management units similar to the M2M device 30, namely, a $K_{Device}$ Management Unit 47 for updating $K_{Device}$ 38, a Functions Unit 48, a TRE Management Unit 49, and a DLUSIM Management Unit 50. The DLUSIM Management Unit interfaces with a SHO handler 51 and a Device handler 52 to interact with the SHO and Device as shown in FIG. 2A. The enterprise server also includes an Application Provisioning Unit 53 and an Application Unit 54.

Figure 5:
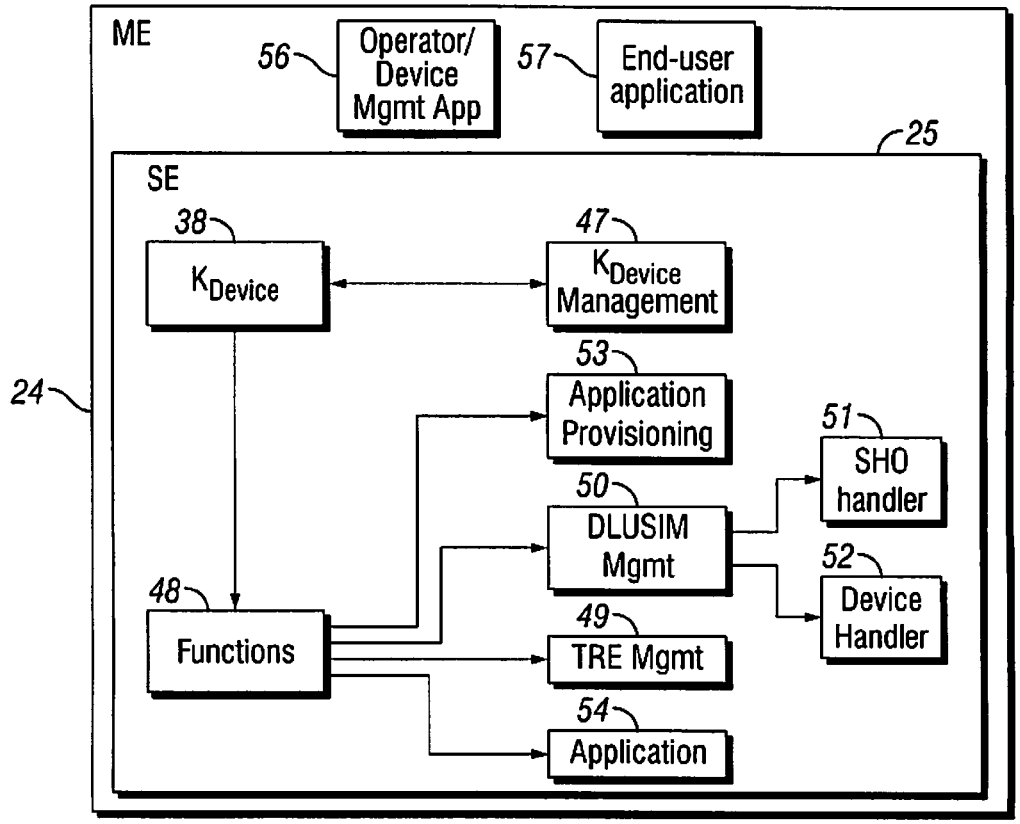
FIG. 5 is a simplified block diagram of a device owner's mobile equipment (ME) in an exemplary embodiment of the present invention.

FIG. 5 is a simplified block diagram of a device owner's mobile equipment (ME) 24 in an exemplary embodiment of the present invention. When the device owner is a consumer, it is natural to consider the consumer to download an application onto his secure element (SE) 25 on his ME, personalize this application with the device key, and then seamlessly interact with the different operators and service providers through this secure application which performs the key-management with the respective entities. In the case of the M2M device being a car, this application may for instance be installed via NFC in the car shop (or over the air if the mobile network operators allow it). So, the source of the device key is the manufacturer, but it can be delivered with the help of the retailer.

The functions contained in the SE are the same as the ones described in the Enterprise server, but the GUI (Operator/Device Management Application) 56 and other non-secret information such as end-user applications 57 may be located outside of the SE. In this way, no secret information ever leaves the SE.

Figure 6:
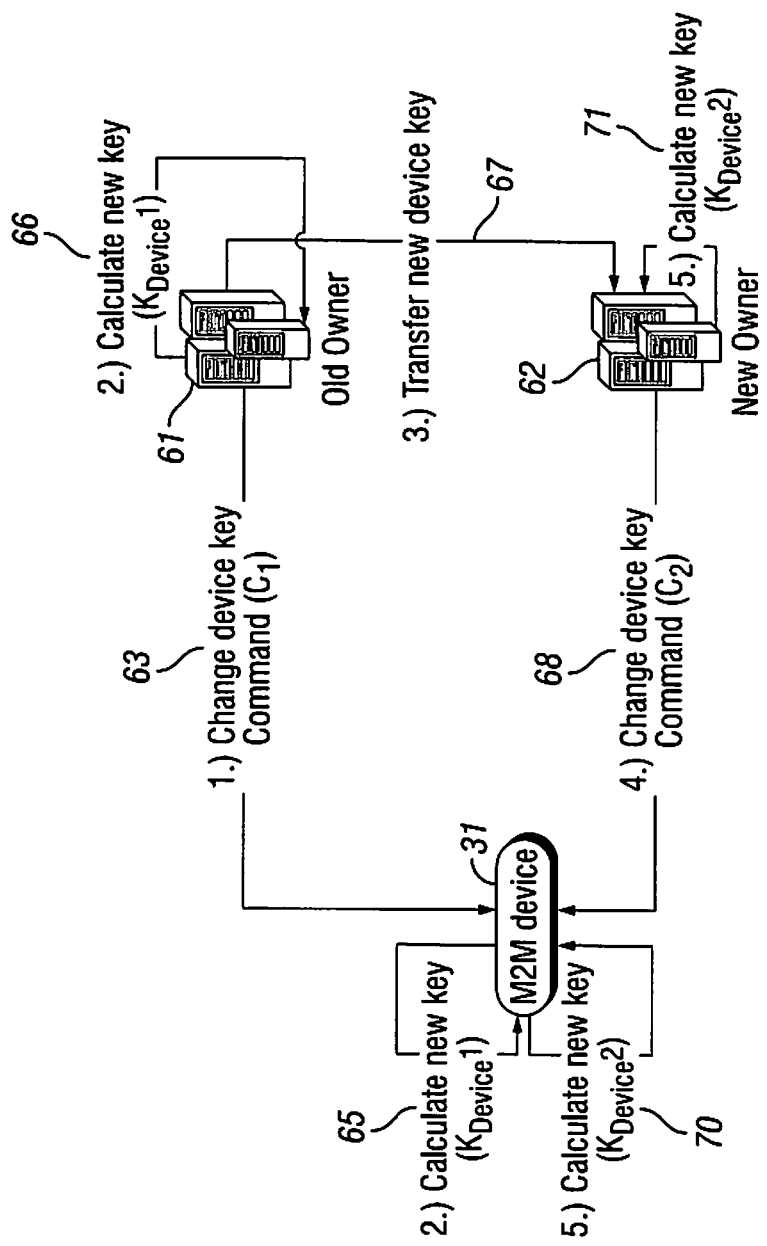
FIG. 6 is a message flow diagram illustrating a procedure for changing a device owner in an exemplary embodiment of the present invention.

FIG. 6 is an illustrative diagram illustrating a procedure for changing a device owner in an exemplary embodiment of the present invention. This procedure is shown in a message flow diagram in FIG. 7. In the case of an owner change of a device, the device key is handed over from the old owner to the new owner. In this case, it is desirable to change the device key. The old owner might want to change the key before handing it over so that the new owner is unable to backtrack old management of the device. Likewise, the new owner may want to change the key after the handover to prevent the old owner from being able to issue new management commands.

Figure 7:
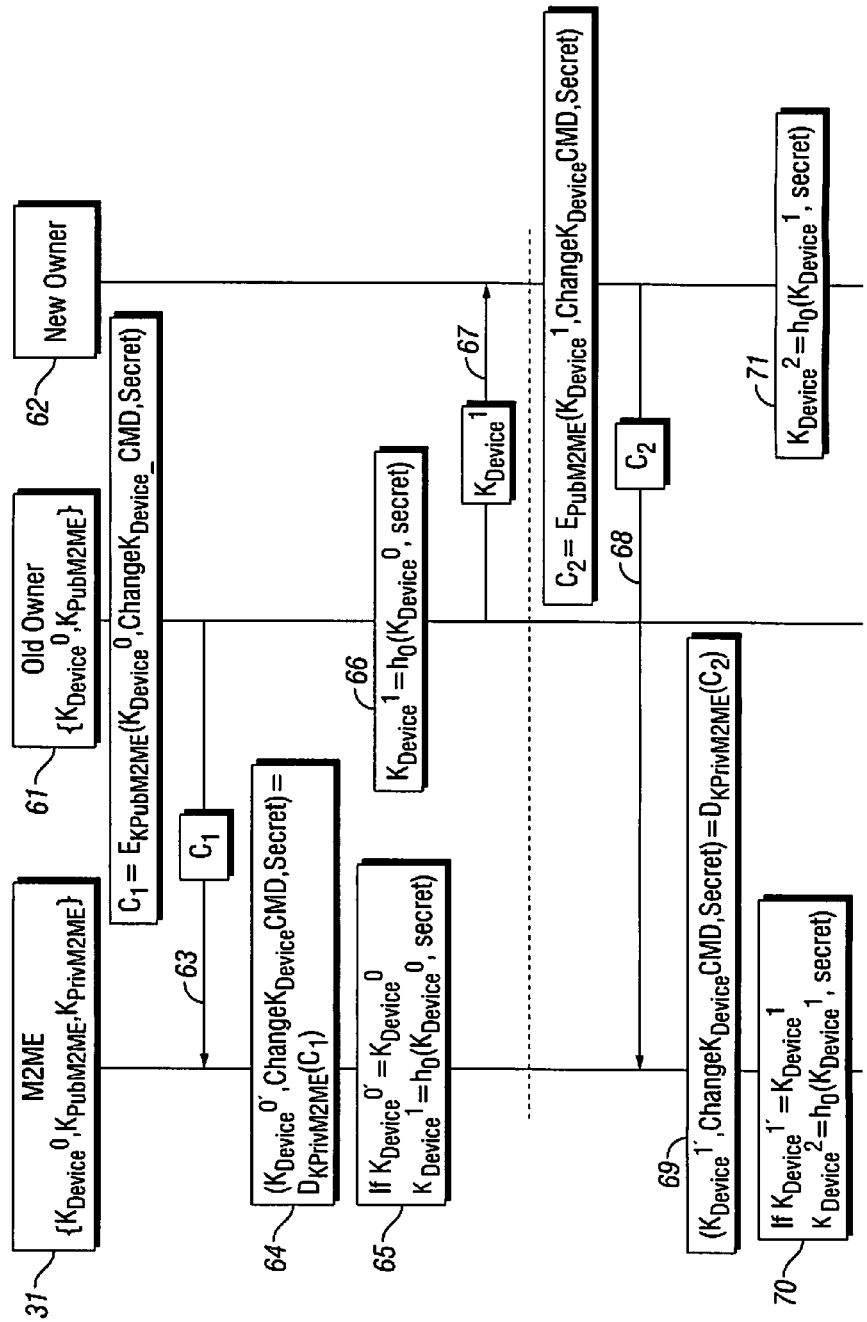
FIG. 7 is a message flow diagram illustrating a procedure for changing a device key before and after a change of owner in an exemplary embodiment of the present invention.

FIG. 6 describes on a high level, a procedure in which an old owner (for example, a first utility company) 61, which owns an M2M device 31 such as an electric metering device, sells and hands over the device key to a new owner such as a second utility company 62. With reference to FIGS. 6 and 7, the procedure will be explained.

At step 63, the old owner's node 61 utilizes a public key of a public/private key pair shared with the M2M device to encrypt the currently active device key $K_{Device}^{0}$ with a change command and a secret parameter known by the old owner's node, and sends a change device key command $C_1$ to the M2M device 31. The M2M device decrypts the command utilizing the private key of the public/private key pair and determines a device key $K_{Device}^{0'}$ at step 64. At step 65, the M2M device compares $K_{Device}^{0'}$ with $K_{Device}^{0}$ to determine if they are equal. If not, the connection is dropped, and the device key remains the same. To avoid brute force attacks, it is prudent that the time between allowed attempts is regulated, and that the device key has sufficient length.

If $K_{Device}^{0'}$ is equal to $K_{Device}^{0}$, the M2M device calculates a new device key $K_{Device}^{1}$ at step 65 using the currently active device key $K_{Device}^{0}$ and the secret parameter received from the old owner's node. The old owner's node also calculates the new device key $K_{Device}^{1}$ at step 66 so that the new device key $K_{Device}^{1}$ does not have to be transmitted over the air interface. At step 67, the old owner's node sends the new device key $K_{Device}^{1}$ to the new owner's node 62, preferably over a secure connection. This provides the new owner's node with control over the M2M device without disclosing the old device key, $K_{Device}^{0}$.

At step 68, the new owner's node 62 utilizes the public key to encrypt the new device key $K_{Device}^{1}$ with a change command and a secret parameter known by the new owner's node, and sends a change device key command $C_2$ to the M2M device 31. The M2M device decrypts the command utilizing the private key and determines a device key $K_{Device}^{1'}$ at step 69. At step 70, the M2M device compares $K_{Device}^{1'}$ with $K_{Device}^{1}$ to determine if they are equal and if so, the M2M device calculates a new device key $K_{Device}^{2}$ using the new device key $K_{Device}^{1}$ and the secret parameter received from the new owner's node. The new owner's node also calculates the new device key $K_{Device}^{2}$ at step 71 so that the new device key $K_{Device}^{2}$ does not have to be transmitted over the air interface. Note that all commands are protected by the asymmetric key $K_{Provision}$, which is not known outside of the TRE 32 of the M2M device, and therefore the new $K_{Device}^{2}$ is impossible for the old owner to retrieve. This scenario is also applicable, for example, when ownership of a car is transferred between an old owner and a new owner.

According to a second exemplary embodiment, an operator change is performed without explicitly sending a USIM or a subscriber key over the air to the device.

According to the invention, a change of operator is performed by the old operator handing over the subscriber key to the new operator. However, as in the previous embodiment, the old and the new operator would like to be able to change the keys to protect themselves against the other operator.

Figure 8:
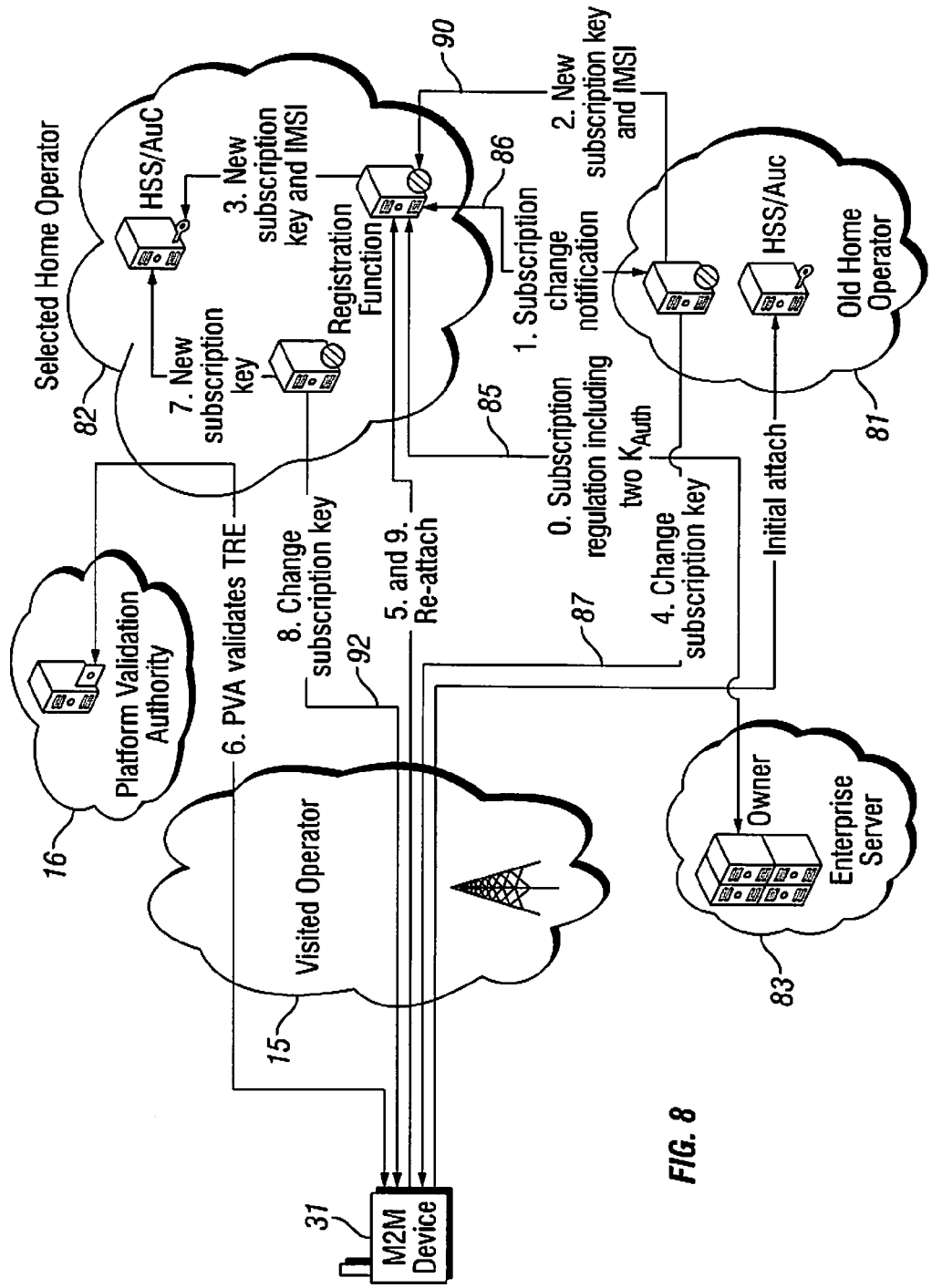
FIG. 8 is a message flow diagram illustrating a procedure for changing an operator with the change of a subscriber key in an exemplary embodiment of the present invention.
Figure 9:
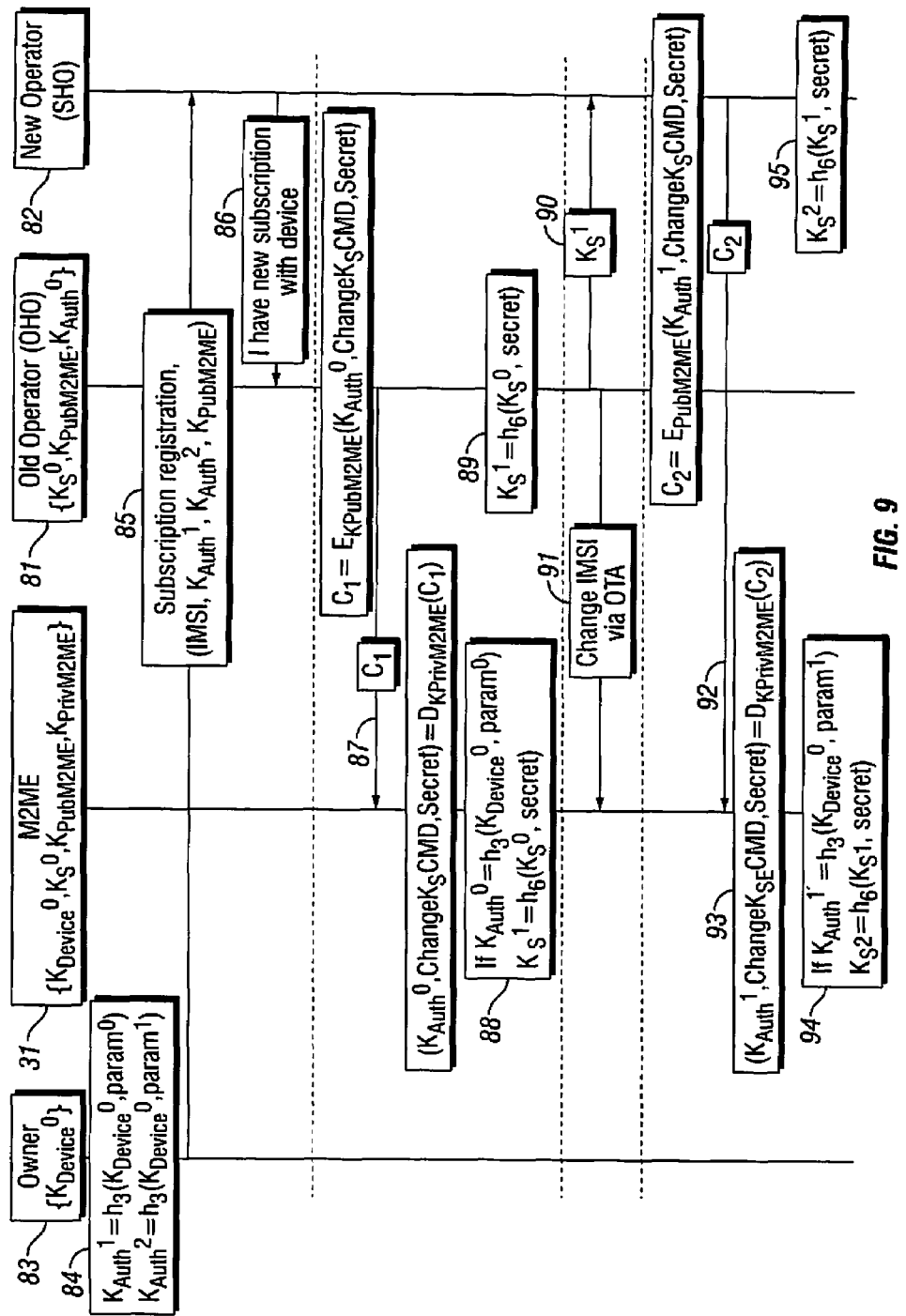
FIG. 9 is a message flow diagram illustrating in more detail the procedure for changing an operator in an exemplary embodiment of the present invention.

FIG. 8 is a message flow diagram illustrating a procedure for changing an operator from an old operator (OHO) 81 to a new operator (SHO) 82 with the change of a subscriber key in an exemplary embodiment of the present invention. FIG. 9 is a message flow diagram illustrating in more detail the procedure of FIG. 8. With reference to FIGS. 8 and 9, the procedure will be explained.

It is assumed that a subscriber key, $K_S^0$, is installed in the M2M device 31, and the old operator 81 is in possession of an authentication key, $K_{Auth}^0$. When the owner 83 of the M2M device creates a new subscription with the new operator 82, the owner derives at least two authentication keys $\{K_{Auth}^1, K_{Auth}^2\}$ from $K_{Device}$ according to $K_{Auth}=h_3(K_{Device}, params)$ at step 84. The first key, $K_{Auth}^1$, is used to authenticate the change of the subscriber key at start of the subscription period. The second key, $K_{Auth}^2$ for the new operator and $K_{Auth}^0$ for the old operator, is used to change the key before handing over the device to a new operator. In one embodiment, the owner may send the authentication keys to the new operator in a subscription registration message at 85, and the new operator informs the old operator at step 86 that the new operator has a new subscription with the M2M device. Of course information may be sent between the entities in different ways due to different setups. For example, the owner may only provide $K_{Auth}^2$ to the new operator at the time of operator change. In this way, the operators do not have to store $K_{Auth}^2$ for the entire subscription period of the device.

At step 87, the old operator 81 utilizes the public key to encrypt $K_{Auth}^0$ with a change command and a secret parameter known by the old operator, and sends a change subscription key command $C_1$ to the M2M device 31. The M2M device verifies the command at step 88, and if the currently active authentication key $K_{Auth}^0$ is correct, the M2M device calculates a new subscription key $K_S^1$ according to $K_S^1=h_6(K_S^0, \text{secret})$. The old operator then calculates the new subscriber key $K_S^1$ at step 89 so that the new subscriber key $K_S^1$ does not have to be transmitted over the air interface. At step 90, the old operator sends the new subscriber key $K_S^1$ to the new operator, preferably over a secure connection. At step 91, the old operator then orders the M2M device to change its IMSI via OTA.

At step 92, the new operator 82 utilizes the public key to encrypt $K_{Auth}^1$ with a change command and a secret parameter known by the old operator, and sends a change subscription key command $C_2$ to the M2M device. At step 93, the M2M device derives a value for $K_{AUTH}^{1'}$ according to $(K_{AUTH}^{1'}, ChangeK_{SE}CMD, Secret)=D_{KprivM2ME}(C2)$. At step 94, the M2M device then verifies that $K_{Auth}^{1'}=h_3(K_{Device}^0, param^1)$ and if so, the M2M device calculates a new subscription key $K_S^2$ according to $K_S^2=h_6(K_S^1, secret)$. The new operator then calculates the new subscriber key $K_S^2$ at step 95 so that the new subscriber key $K_S^2$ does not have to be transmitted over the air interface.

It can be seen that the owner 83 initiates the process, and then the old operator 81 takes over, changes the subscription key, and informs the new operator 82. The new operator then again changes the subscription key, after or before which the new operator may have made a validation of the M2M device. It is important that the device is always placed in an HSS with the correct IMSI and $K_S$. This information can be put in the HSS before the change of subscription key is made, as shown in FIG. 8.

To be able to calculate the resulting key after a run of the key update procedure, an attacker needs to have knowledge of both the previous subscriber key stored in the TRE 32, and the secret sent by the operator. An attempt to change the subscriber key without an included valid authentication key, $K_{Auth}$, results in an aborted procedure. The current authentication key should still remain active, as switching to the next would risk synchronization issues and denial-of-service attacks.

According to still another embodiment, owner and operator are both changed. In the case of an owner change of device, the new owner may also like to switch the operator. In this scenario, it is important to avoid updating a device key and a subscriber key simultaneously. This might result in derived keys that are different on the device and the operator side. The new owner should make sure that he has updated the device key before he contacts the newly selected operator and initiates the switch.

Figure 10:
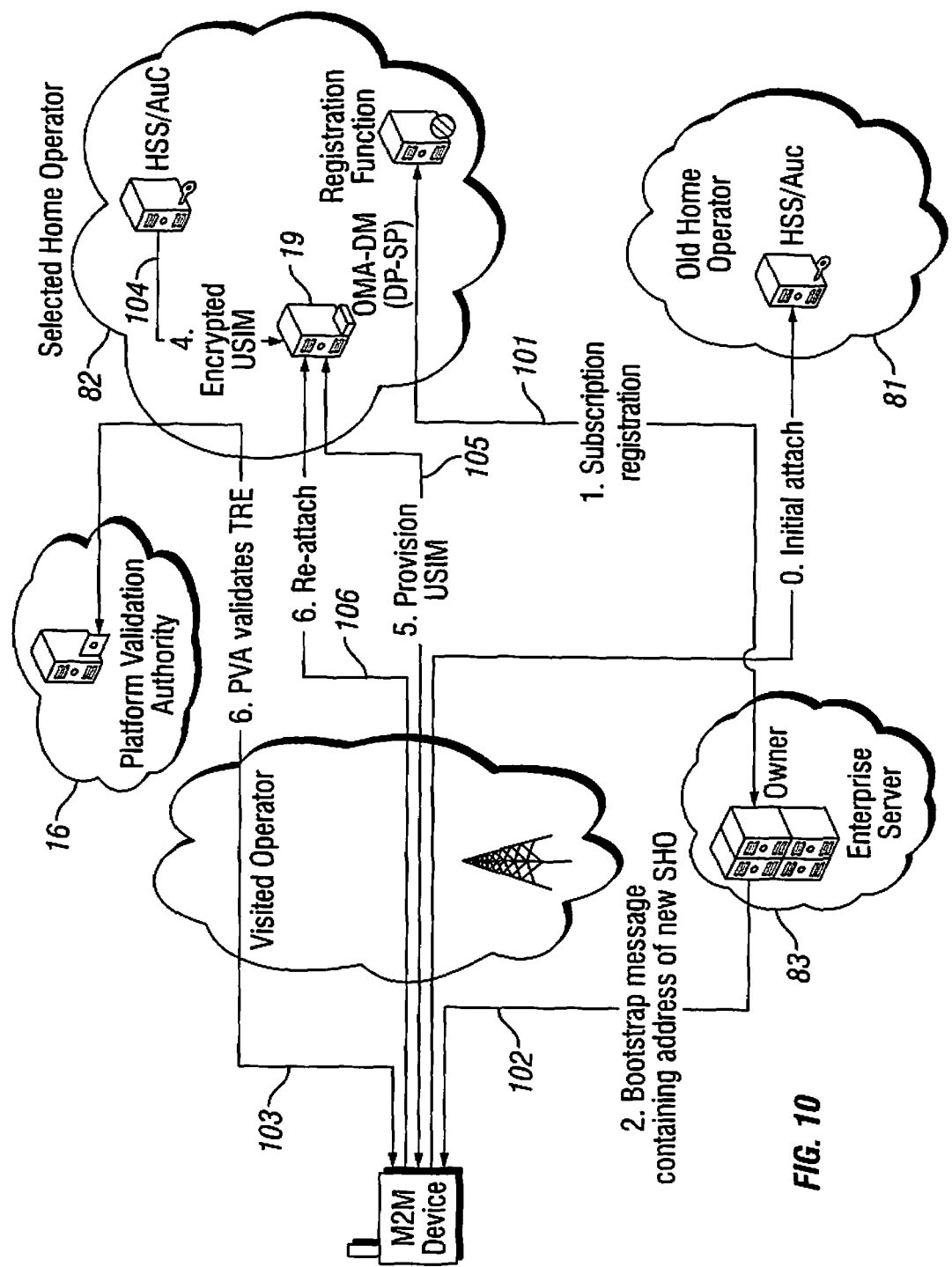
FIG. 10 is a message flow diagram illustrating a procedure for downloading a new DLUSIM as an encrypted blob in an exemplary embodiment of the present invention.

FIG. 10 is a message flow diagram illustrating a procedure for downloading a new DLUSIM as an encrypted blob in an exemplary embodiment of the present invention. According to this embodiment, the enterprise server is more actively involved in downloading the new DLUSIM as an encrypted blob. This has the positive effect that the SHO can utilize any algorithm it wants for key-generation, and specifically, that it is not forced to use MILENAGE. It is also easy to have more than a *SIM in the device at one time.

Initially, the M2M Device 31 is attached to the old home operator's (OHO) network 81. At step 101 the owner registers at a new Selected Home Operator (SHO) 82 and transfers the $K_{Auth}$ as defined above and shown in FIGS. 2A and 2B. At step 102, the M2M Device receives a bootstrapping message instructing the M2M Device to connect to the new SHO's provisioning service. The bootstrapping message may include an address of the SHO and an authentication nonce. This bootstrapping message may be sent from the owner 83, the SHO 82, or from the OHO 81. In FIG. 10, the bootstrapping message is sent from the owner 83. At step 103, the new SHO and PVA 16 validate the M2M Device TRE 32 when the M2M Device attempts to connect to the provisioning service. At step 104, a new USIM is generated and encrypted with the $K_{Provision}$. At step 105, the new USIM is downloaded as an encrypted blob to the M2M Device from the OMA DM provisioning server 19, which may show knowledge of $K_{Auth}$ in this step. At step 106, the device re-attaches to the new SHO 82.

The carrier for both the bootstrapping message and for the DLUSIM blob may be OMA DM. In the above, it is assumed that the authentication nonce in the bootstrapping message is based on $K_{Auth}$. Also, the bootstrapping message may include either a certificate identifying the new SHO, or there may be a $K_{Auth}$ also in the encrypted DLUSIM blob.

Preferably, the USIM is never revealed in a decrypted state outside of the TRE, and preferably $K_{Auth}$ is not revealed outside of the TRE either. From an implementation perspective, the OMA DM client may be located outside of the TRE, and thus in another embodiment, $K_{Auth}$ is not coupled to OMA DM. $K_{Auth}$ may be used either as a password or the basis of a password, which is included in the encrypted blob as a parameter, or $K_{Auth}$ can be used as a integrity protection key such as the key used in a MAC used to protect the encrypted blob.

On the server side, $K_{Auth}$ may be utilized by the OMA DM server, but there are other setups where this is less appropriate. One example is when the OMA DM server is not positioned in the new SHO network. In this case, the operator may apply $K_{Auth}$ and confidentiality protection before handing the encrypted SIM over to the third party supplying the OMA DM service.

The various embodiments described herein may use OMA DM functionality to implement the various functional steps. OMA DM is preferred as the carrier of a DLUSIM, and it is hence preferred to use the OMA DM Mgmt Tree to organize these changes. However, the OMA DM client (which is the engine using the OMA DM Mgmt Tree) is not the sole entity involved in the management of the DLUSIM. There may also be a DLUSIM Mgmt client, which is using the OMA DM client as a subroutine for the provisioning part. Even if the security of the DLUSIM does not hinge on the security of the OMA DM, the OMA DM Mgmt Tree should look correct. Also, the OMA DM engine's security should be based on $K_{Device}$ for other management changes.

It is assumed that the device owner has control of the OMA DM Mgmt object "SEMO". This means in practice that a default OMA DM server identifier may be <device.owner> and that the <device.owner> has Access Control List (ACL) value:

Add=device.owner&Delete=device.owner&Get=*&Replace=device.owner.

The <device.owner> mgmt server may be authenticated by a $K_{Application\ Provisioning}$. It is also acceptable if this same key or derivations of it are used for authenticating other parts of the OMA DM Mgmt Tree. The $K_{Application\ provisioning}$ can of course also be calculated by the TRE. So in principle, the TRE can manage the SEMO in the OMA DM Mgmt Tree itself.

All functions and DLUSIMs in the SEMO then have their own management objects in the SE, which are situated below the SEMO in the OMA DM Mgmt Tree. These functions and DLUSIMs have an extended ACL compared to above, where the SPs or operators can be added to the list as well. To manage these functions in the TRE itself, another key called $K_{TRE\ management}$, also derived from $K_{Device}$, is used in a similar fashion as in the DLUSIM download mechanism described above. This setup gives the device owner the final say in what is happening in his device, but allows the operators to check and verify that no other DLUSIMs are installed in the device, and also to securely manage their own objects.

Further embodiments may use GBA functionality for implementing various detailed functional steps. The $K_{End-user\ service}$ may, for example, be $K_{S-NAF}$ as defined in the 3GPP GBA standard; and the $K_{Device}$ functions as K. This requires that the ME function as the Bootstrapping Server Function (BSF) in the consumer case. To illustrate this use case, consider the case in which the M2M device is a car. Here the owner of the car wants to connect an insurance service to the car. By surfing in to the insurance site, performing a key exchange with the insurance company, and then logging in to the car and performing a similar key exchange, the car and the insurance company can now set up a secure connection with each other according to GBA.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of securely changing control of a device from an old manager to a new manager, wherein the device obeys commands from a manager only if the commands are verifiable utilizing a device key known to the device, said method comprising the steps of:
   initiating the change of control by the old manager, said initiating step including changing a first device key in use between the old manager and the device to a second device key, and sending the second device key from the old manager to the new manager, wherein the step of changing the first device key in use between the old manager and the device to a second device key includes:
      sending a first encrypted command from the old manager to the device to change the first device key to the second device key, the first encrypted command including the first device key and a first secret parameter known by the old manager;
      calculating by the device, the second device key utilizing the first device key and the first secret parameter received from the old manager; and
      calculating by the old manager, the second device key utilizing the first device key and the first secret parameter known by the old manager; and
   completing the change of control by the new manager, said completing step including changing the second device key in use between the new manager and the device to a third device key;
   wherein upon completion of the change of control, the new manager does not know the first device key and the old manager does not know the third device key.

2. The method as recited in claim 1, wherein the step of changing the second device key in use between the new manager and the device to a third device key includes:
   sending a second encrypted command from the new manager to the device to change the second device key to the third device key, the second encrypted command including the second device key and a second secret parameter known by the new manager;
   calculating by the device, the third device key utilizing the second device key and the second secret parameter received from the new manager; and
   calculating by the new manager, the third device key utilizing the second device key and the second secret parameter known by the new manager.

3. The method as recited in claim 2, further comprising the steps of:
   upon receiving the first encrypted command from the old manager, validating by the device that the first encrypted command from the old manager was created with the first device key; and
   upon receiving the second encrypted command from the new manager, validating by the device that the second encrypted command from the new manager was created with the second device key.

4. A method of securely changing a communication device from an old operator to a new operator, wherein the communication device has a subscription key and obeys commands from an operator only if the commands are verifiable utilizing an authentication key known to the communication device, said method comprising the steps of:
   initiating the change of operator by a manager of the communication device, wherein the initiating step includes sending from the manager to the new operator, first and second authentication keys and an identifier of the communication device;
   sending a notification from the new operator to the old operator indicating that the new operator has a new subscription with the communication device;
   in response to receiving the notification, changing a first subscription key in use between the old operator and the communication device to a second subscription key, and sending the second subscription key from the old operator to the new operator, wherein the step of changing the first subscription key in use between the old operator and the communication device to a second subscription key includes:
      sending a first encrypted command from the old operator to the communication device to change the first subscription key to the second subscription key, the first encrypted command including a currently active authentication key and a first secret parameter known by the old operator;
      calculating by the communication device, the second subscription key utilizing the first subscription key and the first secret parameter received from the old operator; and
      calculating by the old operator, the second subscription key utilizing the first subscription key and the first secret parameter known by the old operator; and
   completing the change of operator by the new operator, said completing step including changing the second subscription key in use between the new operator and the communication device to a third subscription key;
   wherein upon completion of the change of operator, the new operator does not know the first subscription key and the old operator does not know the third subscription key.

5. The method as recited in claim 4, wherein the communication device is a mobile device, and the manager sends the first and second authentication keys and the mobile device's International Mobile Station Identifier (IMSI) to the new operator in a subscription registration message.

6. The method as recited in claim 4, wherein the step of changing the second subscription key in use between the new operator and the communication device to a third subscription key includes:
   sending a second encrypted command from the new operator to the communication device to change the second subscription key to the third subscription key, the second encrypted command including the first authentication key received from the owner and a second secret parameter known by the new operator;
calculating by the communication device, the third subscription key utilizing the second subscription key and the second secret parameter received from the new operator; and
calculating by the new operator, the third subscription key utilizing the second subscription key and the second secret parameter known by the new operator.

7. The method as recited in claim 6, further comprising the steps of:
upon receiving the first encrypted command from the old operator, validating by the communication device that the first encrypted command from the old operator was created with the currently active authentication key; and
upon receiving the second encrypted command from the new operator, validating by the communication device that the second encrypted command, from the new operator was created with the first authentication key.

8. The method as recited in claim 6, further comprising validating the communication device by the new operator.

9. A system for securely changing a communication device from an old operator network to a new operator network, wherein the communication device has a subscription key and obeys commands from an operator network only if the commands are verifiable utilizing an authentication key known to the communication device, said system comprising:
an owner node of the communication device configured to initiate the change of operator network by sending a subscription registration message to the new operator network, the subscription registration message including first and second authentication keys and an identifier of the communication device;
a first interface within the new operator network configured to send a notification to the old operator network indicating that the new operator network has a new subscription with the communication device;
a second interface within the old operator network configured to send a first encrypted command to the communication device to change a currently active first subscription key to a second subscription key, the first encrypted command including a currently active authentication key and a first secret parameter known by the old operator network;
a first processor within the communication device configured to calculate the second subscription key utilizing the first subscription key and the first secret parameter received from the old operator network;
a second processor within the old operator network configured to calculate the second subscription key;
a third interface within the old operator network configured to send the second subscription key to the new operator network;
a fourth interface within the new operator network configured to send a second encrypted command to the communication device to change the second subscription key to a third subscription key, the second encrypted command including the first authentication key received from the owner node and a second secret parameter known by the new operator network;
the first processor within the communication device being configured to calculate the third subscription key utilizing the second subscription key and the second secret parameter received from the new operator network; and
a third processor within the new operator network configured to calculate the third subscription key.

10. The system as recited in claim 9, wherein the first processor within the communication device is also configured to:
validate that the first encrypted command from the old operator network was created with the currently active authentication key; and
validate that the second encrypted command from the new operator network was created with the first authentication key.

11. The system as recited in claim 10, wherein the third processor within the new operator network is also configured to validate the communication device.

* * * * *

UNITED STATES PATENT AND TRADEMARK OFFICE
CERTIFICATE OF CORRECTION

PATENT NO.         : 8,578,153 B2                                         Page 1 of 1
APPLICATION NO.    : 12/606490
DATED              : November 5, 2013
INVENTOR(S)        : Eld et al.

It is certified that error appears in the above-identified patent and that said Letters Patent is hereby corrected as shown below:

On the Title Page, in item (12), under "United States Patent", in Column 1, Line 1, delete "Johansson et al." and insert -- Eld et al. --, therefor.

On the Title Page, in item (75), under "Inventors", in Column 1, Line 1, delete "Mattias Johansson," and insert -- Mattias Eld, --, therefor.

In the Specification

Column 10, Line 14, delete "$K_{Devica}^{1}$" and insert -- $K_{Device}^{1}$ --, therefor.

Column 13, Line 2, delete "K." and insert -- $K_s$. --, therefor.

In the Claims

Column 15, Line 18, Claim 7, delete "command, from" and insert -- command from --, therefor.

Signed and Sealed this
Eighth Day of September, 2015

Michelle K. Lee
*Director of the United States Patent and Trademark Office*